Patented Sept. 1, 1936

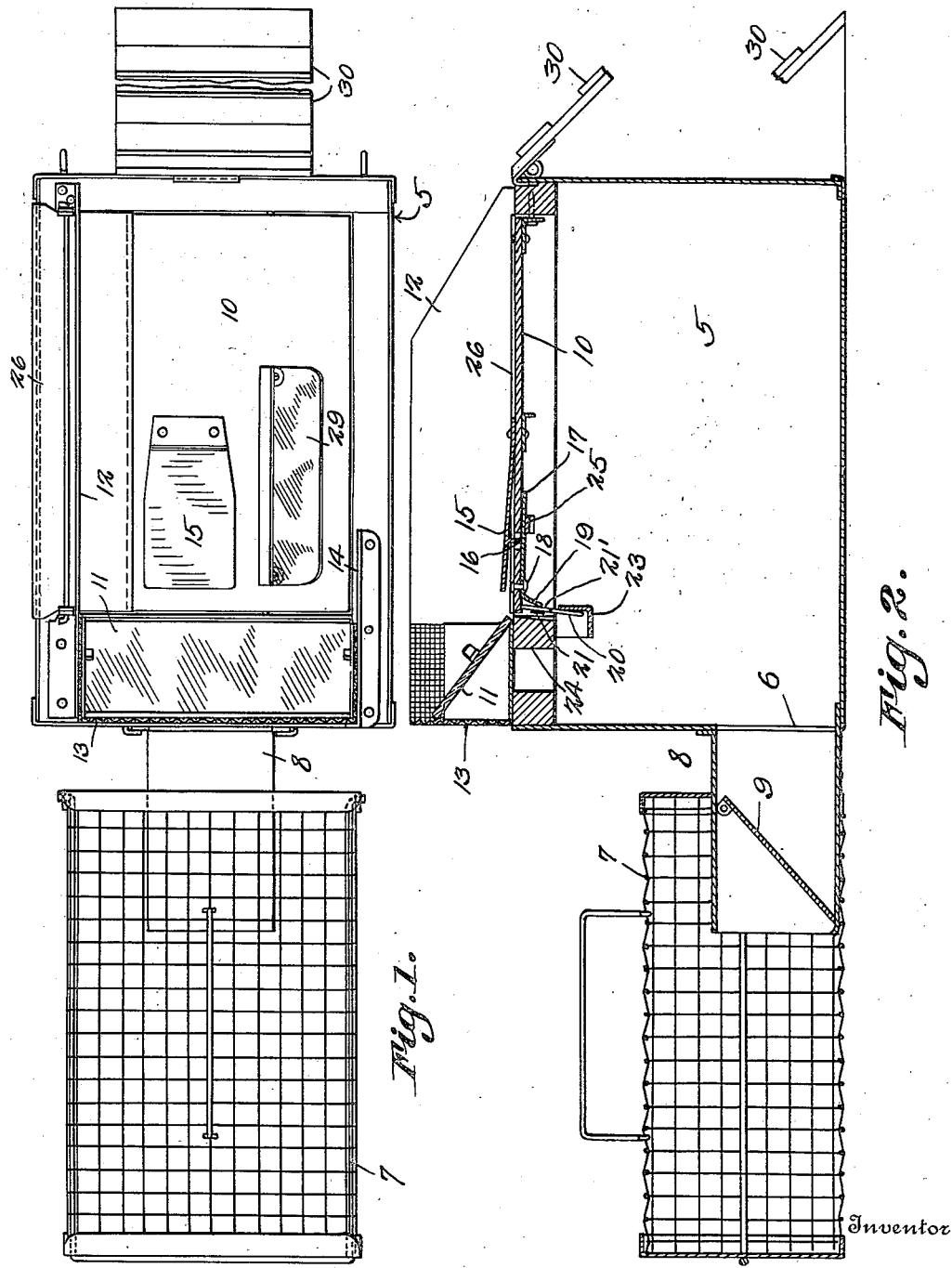

2,052,823

UNITED STATES PATENT OFFICE 2,052,823

TRAP

George H. Hagermann, Muscatine, Iowa

Application September 20, 1934, Serial No. 744,845

1 Claim. (Cl. 43—70)

This invention relates to traps of the ever-set type, the primary object of the invention being to provide a trap of this character wherein the treadle is completely exposed, making it unnecessary for rodents to pass into a long passageway, in order to gain entrance to the trap.

An important object of the invention is to provide a trap of this character which will be exceptionally sensitive and actuated by the weight of the rodent passing onto the treadle of the trap.

A still further object of the invention is to provide a trap which when actuated to trap a rodent, will immediately return to its active or set position automatically.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a trap constructed in accordance with the invention.

Figure 2 is a longitudinal sectional view through the trap.

Figure 3:
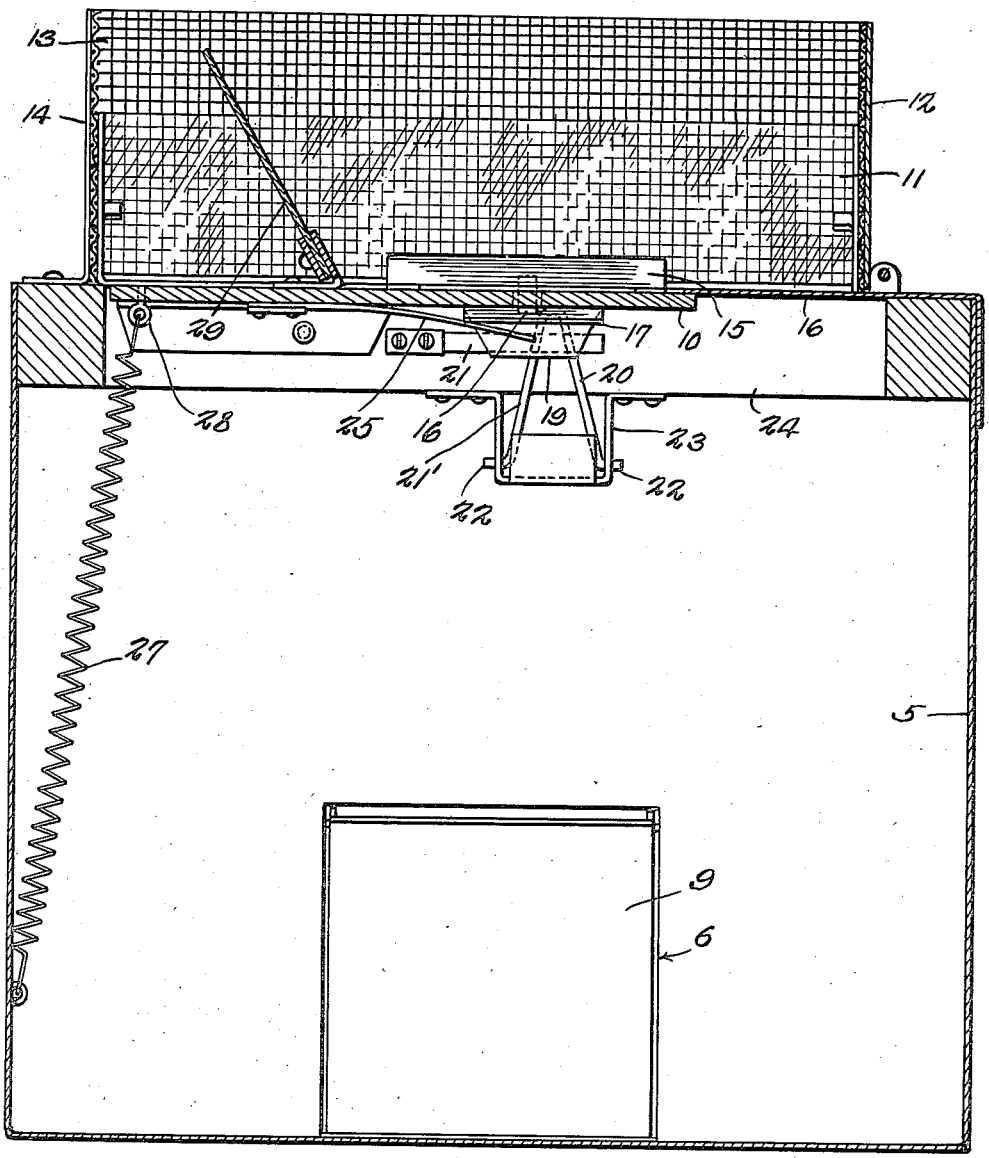
Figure 3 is a vertical sectional view showing the trap on an enlarged scale.

Referring to the drawings in detail, the main or body portion of the trap is indicated generally by the reference character 5, one end wall thereof being provided with an opening 6 providing the outlet opening for the trap, so that rodents caught in the body portion of the trap, may pass into the cage 7. A rectangular hollow member 8 provides a passageway between the body portion 5 and cage 7.

In order that rodents will be prevented from returning into the body portion 5, a pivoted door 9 is provided within the passageway, the door operating in one direction, or in a direction away from the opening 6.

As clearly shown by the drawings, the member 8 extends into an opening in one end of the cage 7 with the result that the cage 7 may be readily and easily removed from the member 8, to permit it to be emptied.

The top of the body portion comprises a pivoted platform 10 onto which rodents pass in an effort to obtain the bait placed at one end of the platform, the bait being held under the glass 11, to the end that the bait is visible at all times, but cannot be eaten by the rodents.

A guard plate indicated at 12 extends upwardly from the top of the body portion 5 and is disposed longitudinally thereof near one edge of the body portion, the guard plate closing one end of the bait compartment.

A member 13 constructed of wire mesh material, extends upwardly from one end of the body portion and provides one side of the bait compartment, the wire mesh material allowing the odor from the bait to circulate exteriorally of the bait compartment, to attract the rodents.

The opposite end of the bait compartment is closed by the upstanding plate 14. Thus it will be seen that the plates 12 and 14 prevent the rodent from passing laterally off of the body portion of the trap, and confine the rodent to that space directly over the treadle of the trap, to be hereinafter more fully described.

The treadle is indicated by the reference character 15 and embodies a flexible plate secured to the pivoted platform 10, at its forward end, as clearly shown by Figure 2 of the drawings, the opposite end of the treadle 15 lying in spaced relation with the pivoted platform 10.

Carried by the treadle 15, and extending downwardly through an opening in the pivoted platform 10, in a pin 16, which pin normally rests on the plate 17 that is pivotally mounted on the underside of the platform 10, at 18, the mounting of the plate 17 being loose so that free pivotal movement of the plate 17 will be permitted.

At the forward end of the plate 17, is a downwardly extended flange 19 that normally engages the pivoted stop 20, which stop is forced outwardly, or to a position directly under the pivoted platform 10, by means of the spring 21, to the end that the pivoted platform is normally held in a horizontal position.

As clearly shown by Figure 3 of the drawings, the stop 20 embodies a length of wire material 21' bent intermediate its ends, and formed with laterally extended ends 22, which ends are fitted in openings of the bracket 23 that is secured to the bar 24 forming a part of the top of the body portion.

A spring member indicated by the reference character 25 engages the free end of the plate 17, normally holding the plate in its active position, for movement by the pin 16.

Pivotally supported by the body portion, is a plate 26 which overlies the inner edge of the pivoted platform providing a stop for the platform and, normally holding the pivoted platform against the action of the coiled spring 27, which has one end thereof secured within the body portion of the trap, while the opposite end thereof connects with the eye bolt 28, which secures the spring to the pivoted platform, urging the pivoted platform to its set or horizontal position.

A guard plate indicated at 29 rises from the pivoted platform 10, at a point adjacent to the treadle, making it necessary for the rodent passing onto the pivoted platform, to walk over the treadle 15.

Should it be desired to gain access to the interior of the body portion, it is only necessary to swing the plate 26 inwardly, and pull upwardly on the edge of the pivoted platform, that contacts with the plate 26. It is necessary to gain access to the interior of the body portion in this way, only when an adjustment of the treadle or stop, is to be made.

A runway indicated by the reference character 30 is positioned at one end of the body portion, so that the rodents may pass upwardly onto the pivoted platform.

When the trap has been set by placing bait in the bait compartment, a rodent attempting to obtain the bait will pass onto the pivoted platform, and because of the guard plates, will necessarily pass onto the treadle 15. The weight of the rodent will move the treadle downwardly, which in turn actuates the plate 17 causing the flange 19 to move against the stop 20, moving the stop out of engagement with the pivoted platform 10. The pivoted platform will now swing downwardly under the weight of the rodent, throwing the rodent into the body portion of the trap.

The rodent in attempting to liberate himself will pass into the cage 7, through the passageway 8, where he will be trapped. By removing the cage 7 from the member 8, the rodents held in the cage 7 may be disposed of.

Having thus described the invention, what is claimed is:

In a trap, a box-like body portion, a pivoted platform forming the top of the body portion, a bracket mounted under the platform and having openings, a vertical stop embodying a length of wire material bent intermediate its ends providing leg members, said leg members having right angled ends fitted in the openings of the bracket, a plate pivotally mounted under the platform, a downwardly extended flange on the forward end of the plate, and normally engaging the stop, a treadle comprising a plate pivotally connected to the platform, a pin extending from the treadle, and engaging the first mentioned plate, whereby the first mentioned plate is operated and the flange is moved against the vertical stop, moving the stop to its inactive position, allowing the platform to move downwardly and means for returning the platform to its normal position.

GEORGE H. HAGERMANN.